United States Patent
Kang et al.

(10) Patent No.: US 6,748,497 B1
(45) Date of Patent: Jun. 8, 2004

(54) SYSTEMS AND METHODS FOR BUFFERING MEMORY TRANSACTIONS

(75) Inventors: Chang Yong Kang, Austin, TX (US); Jun Hao, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 301 days.

(21) Appl. No.: 09/989,635

(22) Filed: Nov. 20, 2001

(51) Int. Cl.[7] ............................................. G06F 12/00
(52) U.S. Cl. ...................... 711/137; 711/140; 711/169; 711/146
(58) Field of Search ................... 711/137, 140, 711/167, 169, 146; 712/218, 225

(56) References Cited

U.S. PATENT DOCUMENTS

| | | | |
|---|---|---|---|
| 5,588,128 A | * 12/1996 | Hicok et al. ................ | 711/204 |
| 6,187,483 B1 | * 2/2001 | Capodieci et al. ............. | 430/5 |
| 6,216,200 B1 | * 4/2001 | Yeager ........................ | 711/100 |
| 6,260,095 B1 | * 7/2001 | Goodrum ..................... | 710/310 |
| 6,282,626 B1 | * 8/2001 | Platko et al. ................ | 711/209 |
| 6,341,335 B1 | * 1/2002 | Kanai et al. ................. | 711/137 |
| 6,370,073 B2 | * 4/2002 | Leung ......................... | 365/222 |
| 6,415,353 B1 | * 7/2002 | Leung ......................... | 711/106 |
| 6,449,685 B1 | * 9/2002 | Leung ......................... | 711/106 |

OTHER PUBLICATIONS

Farkas, et al., "How Useful are Non–blocking Loads, Stream Buffers and Speculative Execution in Multiple Issue Processors?", © 1995 IEEE, pp. 78–89.*

Lepak et al., "Silent Stores and Store Value Locality", © IEEE 2001, pp. 1174–1190.*

Lepak et al., "On the Value Locality of Store Instructions", © 2000 ACM, pp. 182–191.*

Jouppi, Norman P., Digital Equipment Corporation Western Research Lab, "Improving Direct–Mapped Cache Performance by the Addition of a Small Fully Associative Cache and Prefetch Buffers," 1990 IEEE, pp. 364–373.

Palacharla, Subbrano, Computer Sciences Department, University of Wisconsin–Madison and R.E. Kessler, Cray Research, Inc., "Evaluating Stream Buffers as a Secondary Cache Replacement," 1994 IEEE, pp. 24–33.

* cited by examiner

Primary Examiner—Donald Sparks
Assistant Examiner—Brian R. Peugh
(74) Attorney, Agent, or Firm—Winstead Sechrest & Minick P.C.; Jame J. Murphy

(57) ABSTRACT

An apparatus and method for memory transaction buffering are implemented. Read and write buffer units are provided. The read buffer unit is configured for storing at least one data value read from a memory device, and the write buffer unit is configured for storing at least one data value for writing to the memory device. The read buffer unit is operable for updating with the at least one data value for writing to the memory device in response to a write to the write buffer unit.

18 Claims, 11 Drawing Sheets

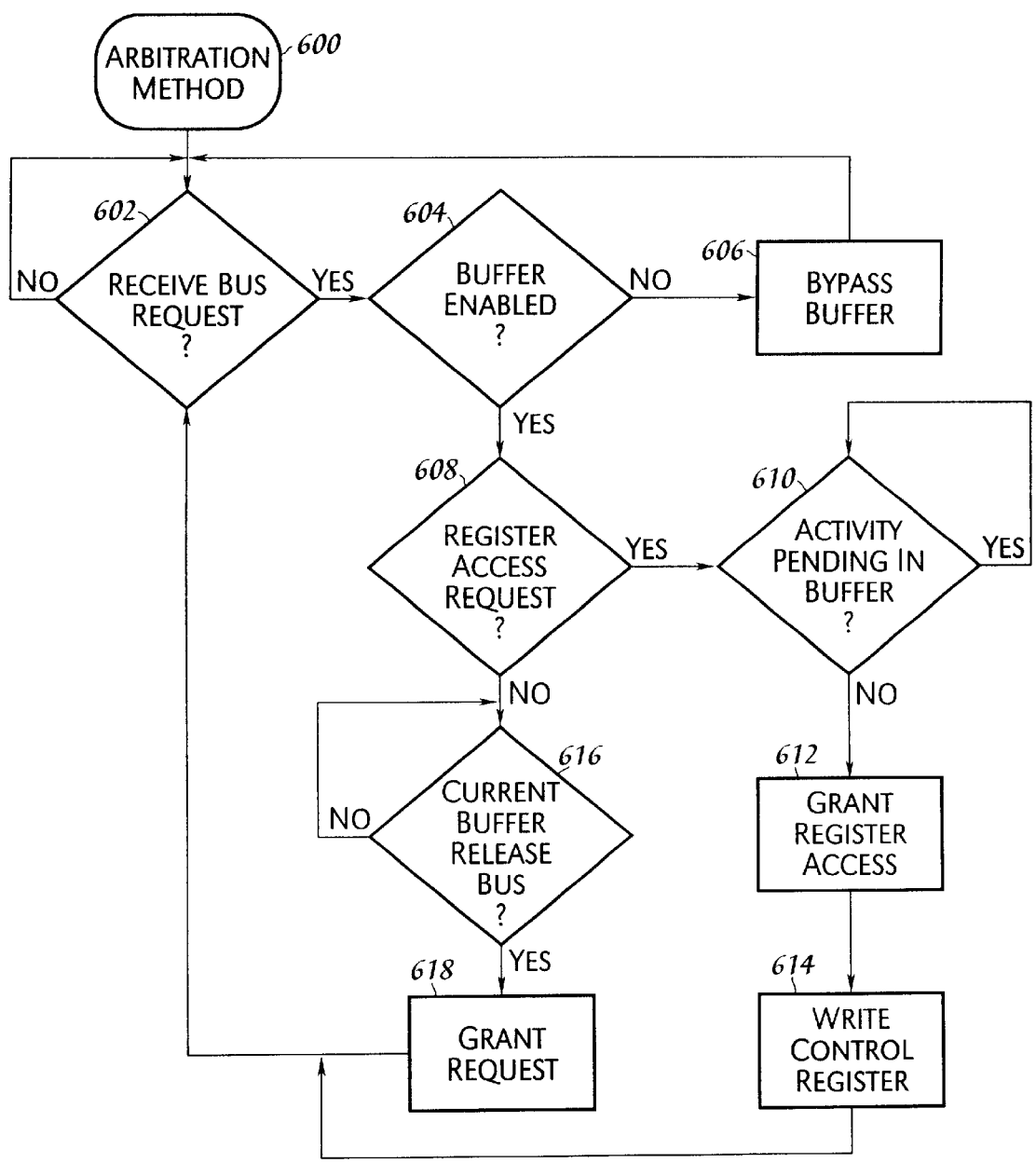
Fig. 6.1

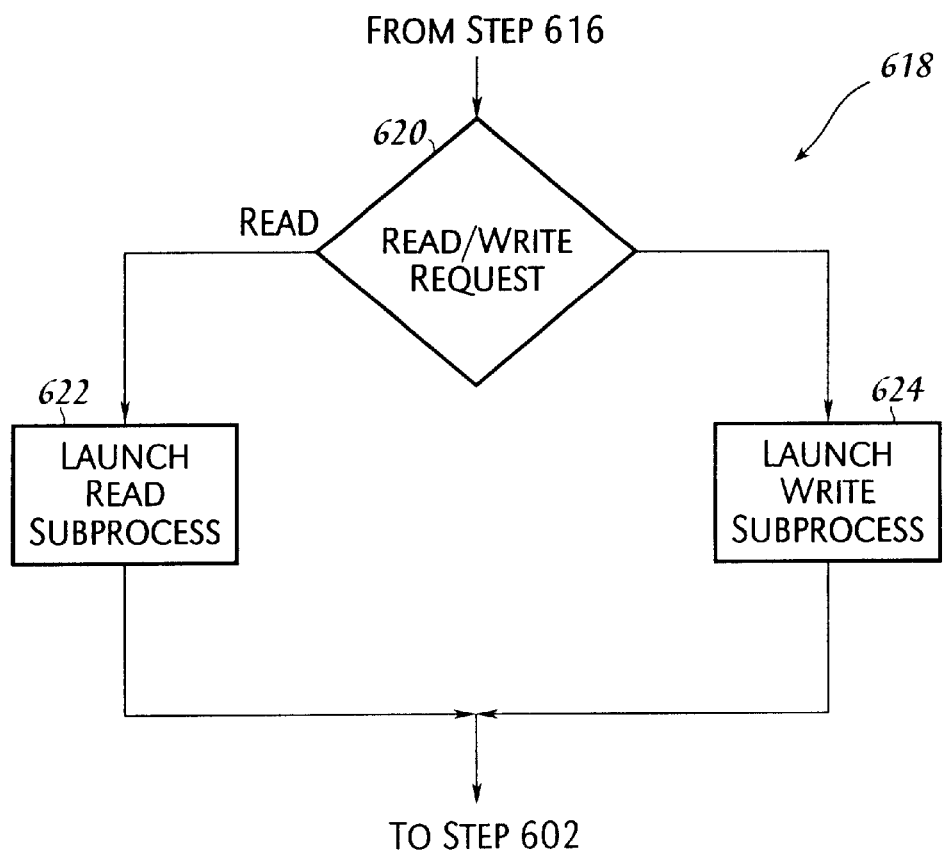
Fig. 6.2

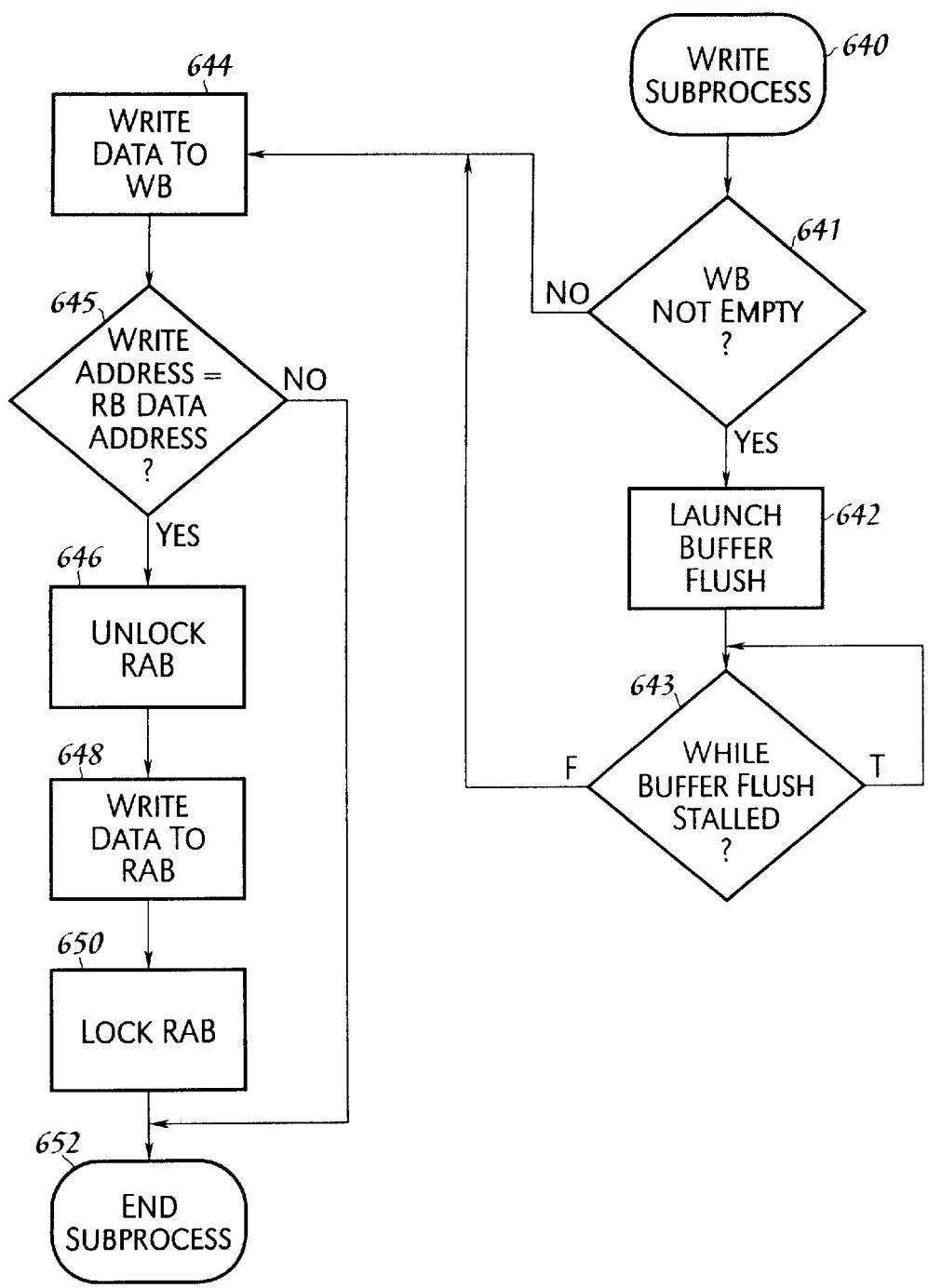
Fig. 6.3

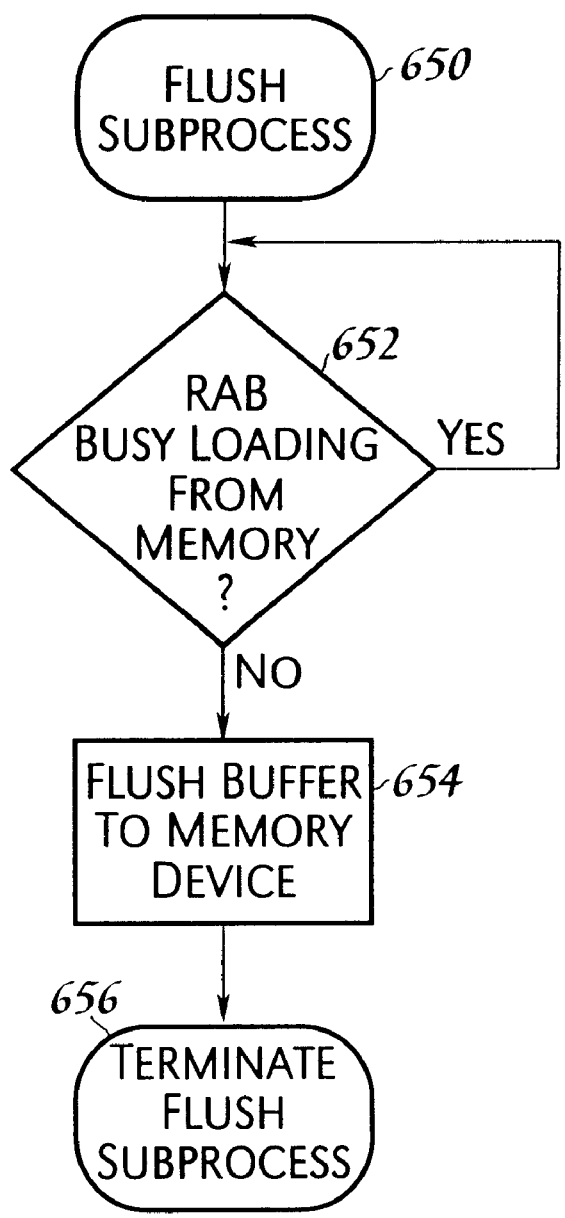
Fig. 6.4

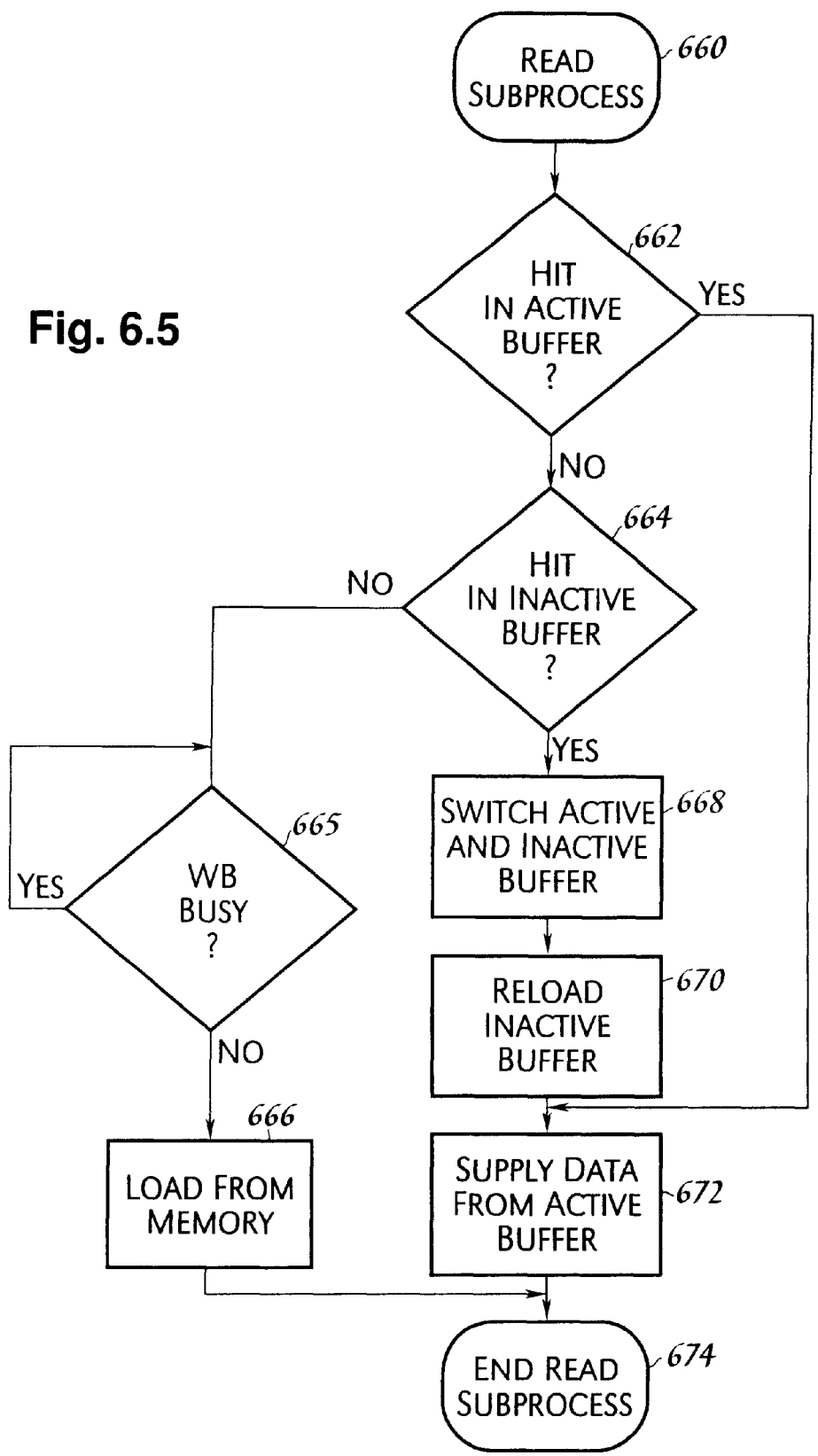
Fig. 6.5

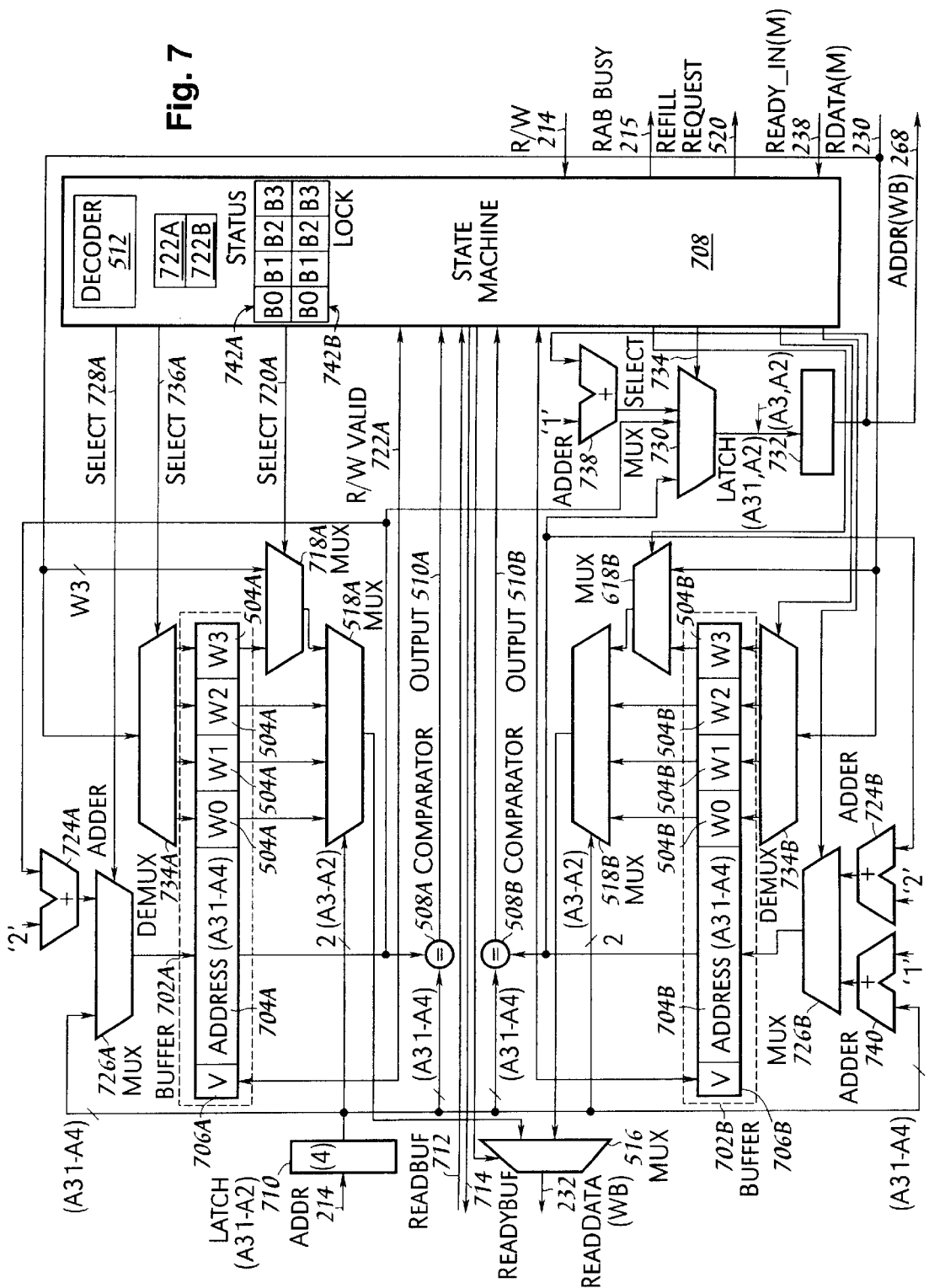

SYSTEMS AND METHODS FOR BUFFERING MEMORY TRANSACTIONS

BACKGROUND OF THE INVENTION

1. Field of the Invention

The present invention relates in general to data processing systems, and in particular, to data processing systems and methods for mitigation latencies in data processing systems including.

2. Description of the Related Art

Modern signal processing systems, such as those found, for example, in commercial and consumer audio and multimedia products, are moving, with improvements in Very Large Scale Integration (VLSI) fabrication processes, to "system on a chip" (SoC) implementations. Such implementations may include one or more processors which may perform signal processing and control functions, on-chip memory, and signal amplification whereby an amplified signal may be delivered directly to the user's listening device, a speaker or a headphone set, for example.

As the sources of digital audio, video and multimedia data have become more sophisticated, the tasks required of the play back systems have correspondingly become more complex. For example, the source stream may be delivered in a compressed format in accordance with one or more standardized compression formats, such as those promulgated by the Motion Picture Experts Group (MPEG). Additionally, the compressed digital audio data may be embedded in a multiplexed bitstream that includes additional data, for example, conditional access information which may be used to limit the access to the underlying content to users who have subscribed thereto. Consequently, the digital signal processing demands placed upon the SoC may be significant. Thus, such an SoC may incorporate a DSP engine to perform the computationally intensive signal processing required to extract and recover the uncompressed digital data. Instructions and data for the DSP engine may be stored in memory which may be on chip, off chip, or a combination of both. Typically, the speed of the DSP exceeds that of the memory devices, and in modem DSP systems the memory latency can be long enough to stall the DSP engine while the memory transaction (read/write) completes. Buffers inserted between the memory system and the DSP may be used to reduce latency penalties associated with memory reads by speculatively prefetching and storing instructions or data. However, systems using such buffer mechanisms have, heretofore remained vulnerable to memory latencies with respect to writes to memory.

Consequently, there is a need in the art for systems and methods to shield a DSP(or similar high-performance processor) from memory latencies. In particular, there is a need for such systems and methods adapted for both read and write transactions.

SUMMARY OF THE INVENTION

According to the principles of the present invention, a buffer apparatus is disclosed that includes a read buffer unit configured for storing at least one data value read from a memory device, and a write buffer unit configured for storing at least one data value for writing to the memory device. The read buffer unit is operable for updating with the at least one data value for writing to the memory device in response to a write to the write buffer unit.

The inventive concept addresses a problem modem signal processing systems, such as those found, for example, in commercial and consumer audio and multimedia products, particularly, with improvements in Very Large Scale Integration (VLSI) fabrication processes, "system on a chip" (SoC) implementations. As the sources of digital audio, video and multimedia data have become more sophisticated, the tasks required of the play back systems have correspondingly become more complex. Consequently, the digital signal processing demands placed upon the SoC may be significant, and such an SoC may incorporate a DSP engine to perform the computationally intensive signal processing required to extract and recover the uncompressed digital data. Instructions and data for the DSP engine may be stored in memory which may be on chip, off chip, or a combination of both. Typically, the speed of the DSP exceeds that of the memory devices, and in modern DSP systems the memory latency can be long enough to stall the DSP engine while the memory transaction (read/write) completes. The read and write buffers units of the present invention may mitigate against memory latencies while maintaining coherency between the data therein.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6.1–6.5 illustrate, in flowchart form, an arbitration methodology transactions which may be used with the buffer unit of FIG. 2 in accordance with an embodiment of the present invention principles; and FIG. 7 illustrates in block diagram form, portions of the read-ahead buffer of FIG. 5 in further detail.

DETAILED DESCRIPTION

Figure 1:
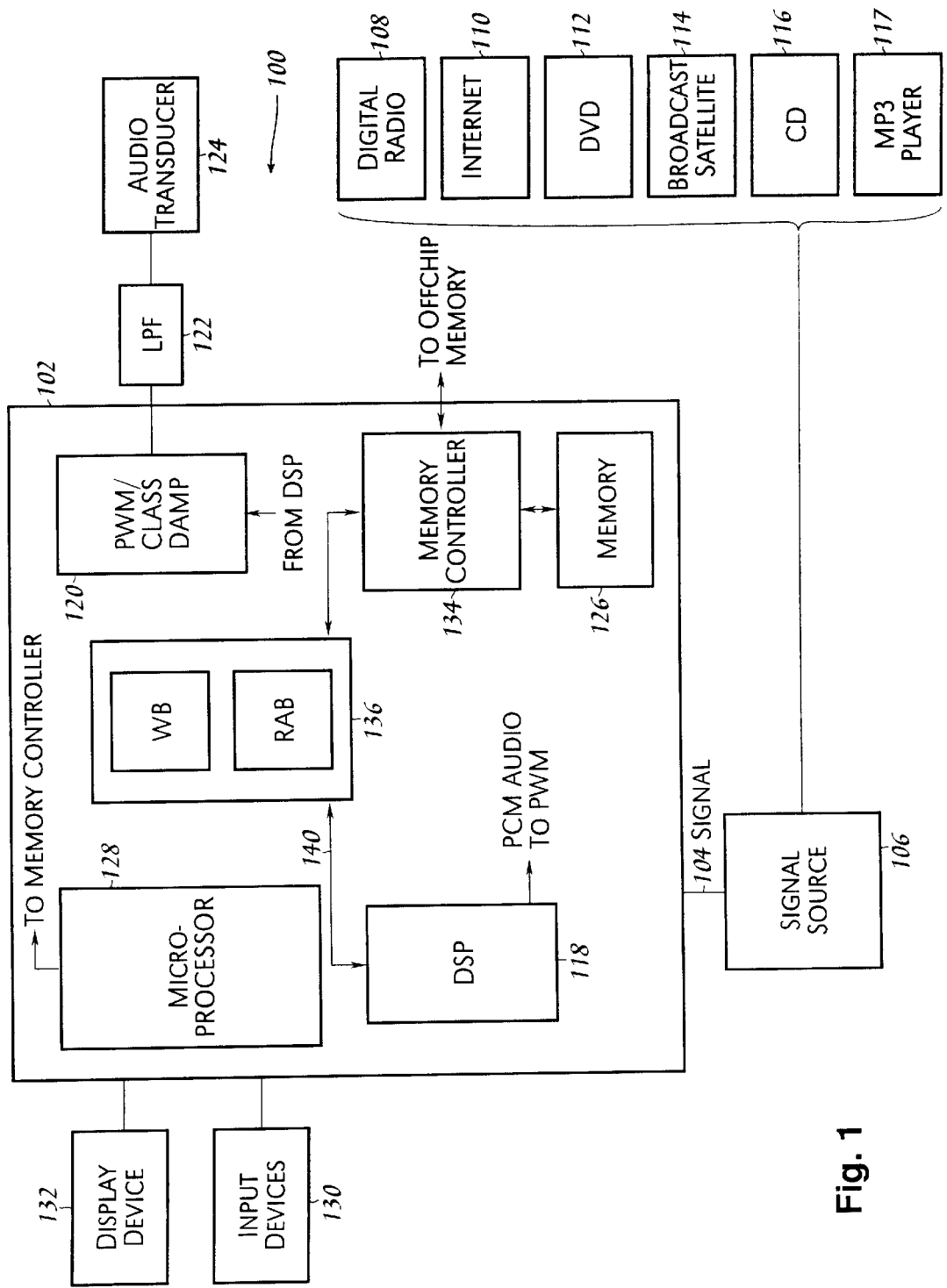
FIG. 1 illustrates, in block diagram form an audio system in accordance with an embodiment of the present invention.

In the following description, numerous specific details are set forth such as specific time slices, etc. to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details concerning time and considerations and the like have been omitted inasmuch as such details are not necessary to obtain a complete understanding of the present invention and are within the skills of persons or ordinary skill in the relevant art. Furthermore, in describing an embodiment of the invention, the terms "assert" and "negate" and various grammatical forms thereof, may be used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Refer now to the drawings wherein depicted elements are not necessarily shown to scale and wherein like or similar elements are designated by the same reference numeral through the several views.

FIG. 1 illustrates a digital audio system 100 incorporating the principles of the present invention. System 100 includes system-on-a-chip (SoC) 102. SoC 102 receives digital signal 104 from a signal source 106, which may include one or more of, for example, a digital radio 108, an Internet audio or multimedia stream 110, a digital video disk (DVD) player 112, direct broadcast satellite (TV/radio) 114, audio compact disk (CD) player 116 and MP3 player 117. (As would be appreciated by those of ordinary skill in the art MP3 refers to Motion Picture Experts Group (MPEG) I Audio layer 3 compressed audio format.) Digital signal 104 may be a conventional pulse code modulated (PCM) digital representation of an audio signal, or may represent a more complex digital content stream, for example, an MPEG Transport Stream, which may include multiplexed content streams in compressed, digitized form (referred to as packetized elementary streams (PES)) along with, optionally, conditional access packets that contain information necessary to decrypt content that is directed to paid subscribers thereof.

Digital signal processing (DSP) engine 118 processes signal stream 104. DSP 118 may, for example, depending on the format of the signal stream provided by signal source 106 may decompress, decrypt, and demultiplex the digital signal, as well as perform other signal processing, for example, filtering, of the signal, and provides a processed PCM audio signal to pulse width modulator (PWM)/class D amplifier 120. PWM/class D amplifier 120 provides a digital to analog conversion, generating an amplified audio signal. The output analog signal is filtered via a low pass filter (LPF 122) and provided to audio transducer 124, for example a speaker or headset, for presentation to the user.

Instructions and data for DSP 118 may be included in on-chip memory 126 or a combination of on-chip memory 126 and off-chip memory (not shown in FIG. 1).

SoC 102 also includes microprocessor ($\mu$P) 128. Microprocessor 128 may perform input/output (I/O) and control functions and other tasks which do not require the capabilities of a DSP engine associated with computationally intensive signal processing. Microprocessor 128 may handle communication with peripheral devices, process interrupts, and read and write control information to memory. For example, microprocessor 128 may process signals received from user input devices 130. Such user input devices may, for example, provide signals for selecting particular content to be output by SoC 102 from a multiplexed transport stream via signal 104. Additionally, microprocessor 128 may, in response thereto, generate output signals for display on display device 132, which may for example, be a liquid crystal display (LCD). Displayed information may include information with respect to the signal source such as a title, track number etc.

Instructions and data for microprocessor 128 may be contained in on-chip memory 126, an off-chip memory (not shown in FIG. 1), or a combination of on-chip and off-chip memory. Note that memory 126 and off-chip memory, if any, may constitute a memory space that is shared by microprocessor 128 and DSP 118. For example, data for the control of DSP 118, in response to user input, may be generated by microprocessor 128 and stored in memory 126 or off-chip memory, if any.

Memory 126, and any off-chip memory are accessed via memory controller 134. Memory controller 134 may be a static memory controller, or alternatively a synchronous dynamic random access memory (SDRAM) memory controller, depending on the type of memory implemented for memory 126 and any off-chip memory. Buffer unit 136 may be interposed between DSP 118 and memory controller 134. Buffer unit 136 may include a write buffer (WB) portion and a read-ahead buffer (RAB) portion, and associated logic for configuring and controlling the buffer (not shown in FIG. 1). Data and control signals may be communicated between DSP 118, buffer unit 136 and memory controller 134 via bus 140, which may be a pipelined bus. A pipelined bus architecture which may be used in conjunction with the present invention is the Advanced Microprocessor Bus Architecture (AMBA) Advanced High-performance Bus (AHB). (AMBA™ AHB is an open bus architecture promulgated by ARM Ltd., and is defined in the AMBA™ Specification (Rev. 2.0), 1999, which is hereby incorporated herein by reference.) The operation of an embodiment of buffer unit 136 and associated configuration and control logic in accordance with the present inventive principles will be described in conjunction with FIGS. 2–7 hereinbelow.

Figure 2:
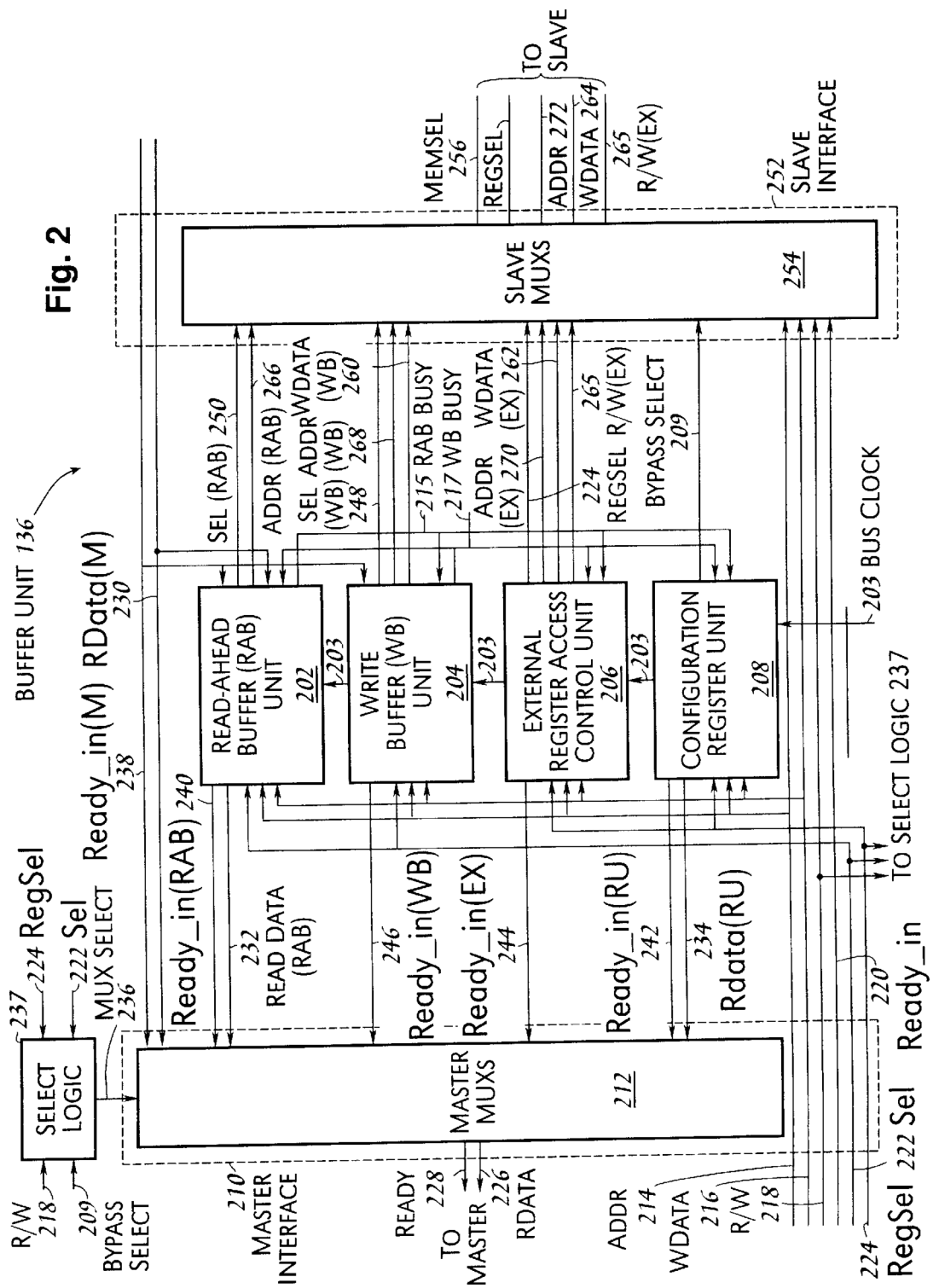
FIG. 2 illustrates, in block diagram form, a buffer unit in accordance with an embodiment of the present invention.

Refer now to FIG. 2 illustrating in block diagram form, a buffer unit 136 in accordance with the present inventive principles. Buffer unit 136 includes read-ahead buffer unit (RAB) 202 and write buffer unit (WB) 204. As will be described further hereinbelow, RAB 202 may reload data (which, for the purposes herein, refer generically to both data or instructions). Write buffer 204 may store write transactions from a bus master to memory. Additionally, buffer unit 136 also may include external register access control unit 206 and configuration register unit 208. External register access control unit 206 effects data writes to external registers, for example, registers in the memory controller, such as memory controller 134, FIG. 1. Configuration register unit 208 includes registers, which may be written and read by a bus master, to hold configuration data for buffer unit 136.

For example, configuration register unit 208 may include registers for programming buffer unit 136 to bypass either of RAB 202 or WB 204 or both. In response to the programming of configuration register unit 208, bypass select 209 may be provided to effect the bypassing of the buffer units, and selected values of bypass select 209 may correspond to bypassing one of RAB 202, WB 204 or both. For example, bypass select may be a two-bit signal wherein selected bit pairs correspond to bypassing RAB 202, bypassing WB 204 and bypassing both RAB 202 and WB 204, however, those of ordinary skill would appreciate that other, alternative, implementations of bypass select 209 may be used, and such alternative implementations would fall within the spirit and scope of the present invention. The operation of external register access control unit 206 and configuration register unit 208 will also be discussed hereinbelow. (From the perspective of a memory device, each of RAB 202, WB 204, external register access control unit 206 and configuration register unit 208 may themselves be bus masters and each may be coupled to bus clock 203.)

Master interface 210 includes master multiplexer (MUX) 212 and a set of data in control lines, which may be at least a portion of a system bus such as bus 140, FIG. 1. The set of data in control lines include address (Addr) 214, write data (WData) 216, read/write (R/W) 218 ready_in 220, memory select (Sel) 222, and register select (RegSel) 224. Master MUX 212 multiplexes data and control signals from a slave device and from RAB 202, WB 204, external register access control unit 206 and configuration register unit 208, and outputs read data (RData) 226 to a bus master.

Additionally, master MUX 212 may output a ready signal 228 to the bus master. (Note, that in an embodiment implemented in accordance with the AMBA™ Specification ready 228 may be asserted by a slave device, such as memory controller 134, to indicate that a transfer has finished on the bus. In the nomenclature of the AMBA™ Specification, ready 228 may be denoted HREADY.)

Data output on RData 226 may be output in response to a read request from the master device. A read request may be indicated by R/W 218 having a first predetermined value, for example, a logic "low." R/W 218 defines a transfer direction, and may be a one-bit signal. Conversely, a logic "high" may indicate a write transfer. (In an embodiment implemented in accordance with the AMBA™ Specification, this signal corresponds to HWRITE in the nomenclature thereof.) It would be appreciated that in alternative embodiments of a buffer unit in accordance with the present invention, other bus architectures may be used to, and in particular a different set of signal states to define the transfer direction may be used, and such alternative embodiments would fall within the spirit and scope of the present invention.

For a read transaction, data may be read from RAB 202 or directly from memory, via the memory controller. Whether data is read from RAB 202 or directly from memory depends on both the programmable configuration of buffer unit 136 and the contents of RAB 202 relative to the read address. This will be discussed hereinbelow. Additionally, configuration information for buffer unit 136 may be read from configuration register unit 208. MUX 212 selects for the read data output on RData 226 from RData (M) 230 (if the read transaction bypasses the RAB), RData (RAB) 232 or RData (RU) 234 in response to MUX select 236. Select logic 237 may register activity of the Sel 222 and RegSel 224 signals and determine the targeted device of the read request, and output MUX select 236 to select the corresponding data line and ready_in signal. Additionally, select logic 237 may effect the bypass of RAB 202 in response to bypass select 209. Similarly, MUX 212 selects for a corresponding one of ready_in (M) 238, ready_in (RAB) and ready_in (RU) 242 for outputting on ready line 228.

During the pendancy of an RAB transaction, RAB busy 215 may be asserted. As described hereinbelow in conjunction with FIGS. 6.1–6.4, RAB busy 215 may be used in conjunction with an arbitration process which effects arbitration between transactions in buffer unit 126. In particular, RAB busy 215 may be asserted in response to a loading of the RAB from a memory device wherein the RAB acts effectively as a bus master from the perspective of the slave side memory bus.

The write data flow through buffer unit 136 will now be described. Data to be written to a memory device, or internal or external registers is provided on WData 216 to each of RAB 202, WB 204, external register access control unit 206 and configuration register unit 208. As discussed hereinabove, the targeted device is selected in response to Sel 222 and RegSel 224. Note that write data is provided to RAB 202. As will be described further hereinbelow, by providing write data in this way, data coherency may be maintained. Write data may be stored in WB 204, and as well, passed through to a memory device on WData (WB) 260. Similarly, write data targeted for an external register, for example, a register in the memory controller, may be input to external register access control unit 206. The write data is passed through to the slave memory device on WData (EX) 262. Note that external register access control unit may latch the data pending a bus grant to the memory controller. Additionally, the transaction direction (here a "write") may be forwarded on R/W (EX) 265 via MUX 254.

Write data input to slave MUX 254 from WData (WB) 260 and WData (EX) 262 are output to the slave device on WData 264 by slave MUX 254. Additionally, WData 216 is input to slave MUX 254, and may be output on WData 264 in response to MUX select 258. In this way, buffer unit 136 may be bypassed for write transactions.

During pendancy of a WB transaction, WB busy 217 may be asserted. In particular, WB busy 217 may be asserted in response to a loading of the RAB from a memory device wherein the RAB acts effectively as a bus master from the perspective of the slave side memory bus. Similarly to RAB busy 215, WB busy 217 may be used in conjunction with the buffer unit arbitration mechanism.

Each of RAB 202 and WB 204 receive select 222. Select 222 may serve as a chip select for the targeted slave device. That is, select 222 may serve as a slave select signal. In an embodiment of the present invention implemented in accordance with the AMBA™ (Specification, select 222 may be derived from a combinatorial decode of at least a portion of the AMBA AHB address bus.) Select 222 is communicated to the slave device on Sel (WB) 248 and Sel (RAB) 250. Sel (WB) 248 and Sel (RAB) 250 may, respectively, be regenerated by logic in the corresponding one of WB 204 and RAB 202 in response to select 222 and R/W 218. One of Sel (WB) 248 and Sel (RAB) 250 is communicated to the slave device via slave interface 252 which includes slave MUX 254. Slave MUX 254 outputs the chip select on Sel 256 in response to MUX Select 258.

Similar to Select 222, register select (RegSel) 224 provides a chip select for transactions targeted for memory controller registers or configuration registers for buffer unit 136. RegSel 224 is provided to external register access control unit 206 and configuration register 208. (In an embodiment implemented in accordance with the AMBA Specification, RegSel 224 may be derived from a combinatorial decode of at least a portion of the address bus.)

The target address for the transaction (a read or write) may be input to buffer unit 136 on Addr 214, which is provided to RAB 202, WB 204, external register access control unit 206 and configuration register unit 208. (External register access control unit 206 may latch the address pending a bus grant to the memory controller register space.) The operation of RAB 202 and WB 204 with respect to the address input on Addr 214 will be described hereinbelow in conjunction with FIGS. 3–7. Additionally, RAB 202 and WB 204 pass the address through on Addr (RAB) 266 and Addr (WB) 268, respectively, to slave MUX 254. Note, however, that a read from memory, the address passed by RAB 202 on Addr (RAB) 266 may be offset to the next sequential location in memory from the address asserted on Addr 214, because of the read-ahead operation of RAB 202. This will be discussed hereinbelow in conjunction with FIG. 7. Additionally, external register access control unit 206 passes an address into the memory controller register space on Addr (EX) 270 to MUX 254.

Slave MUX 254 outputs one of the addresses on Addr (RAB) 266, Addr(WB) 268 and Addr(EX) 270 on Addr 272. The address asserted on Addr 214 is also input directly into slave MUX 254. MUX 254 may include logic to decode the input selection information, Sel (WB) 248, RegSel 224, and SEL (RAB) 250 to generate an internal selection signal, in combination with bypass select 209, to select the between the inputs to MUX 254. The address selected for the output may depend on the direction of the transaction (R/W) target device (for example, memory or external register space), and the configuration of buffer unit 136, that is, whether buffer unit 136 is active, or bypassed.

Additionally, external register access control unit 208 provides ready_in (EX) 244 and ready_in (WB) 246 is provided by write buffer 204. The signal may be selected for outputting on ready 228 by MUX 212 in response to a memory device transaction (read/write). These provide a corresponding handshake signal (discussed further in conjunction with FIG. 4) in response to MUX select 236, to the bus master. Select logic 237 may output MUX select 236 by registering activity on Sel 222 and RegSel 224, the state of R/W 218 and bypass select 209. Bypass select 209 may have a predetermined value signaling that buffer unit 136 is programmed to bypass WB 204. For example bypass select may be a two-bit value wherein a preselected bit pair denotes that WB 204 is bypassed.

Figure 3:
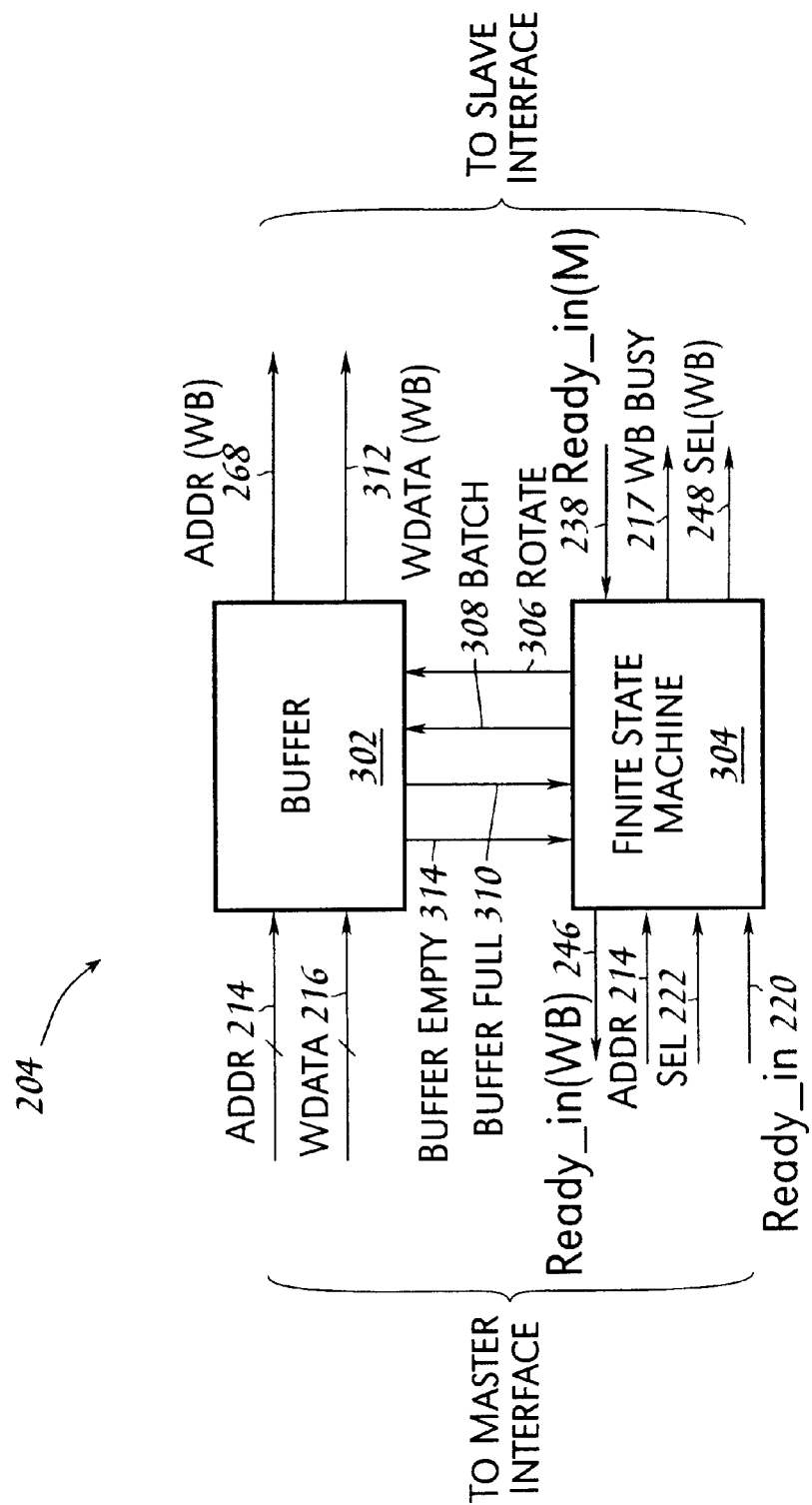
FIG. 3 illustrates, in block diagram form, a write buffer portion of the buffer unit of FIG. 2.

Refer now to FIG. 3 illustrating WB 204 in additional detail. WB 204 includes buffer 302 and state machine 304. Buffer 302 may be a circular, first-in-first-out (FIFO) buffer. WData 216 is input to buffer 302. In an embodiment of the present invention implemented in accordance with the AMBA AHB architecture, WData 216 may be thirty-two bits wide. Additionally, buffer 302 may have a selectable depth which may be configured at compile time. In other words, buffer 302 having a selected depth, m, may store m j-bit values, where j is the width of data bus WData 216. The m values may be stored in buffer 302 in FIFO fashion. Buffer 302 latches data in response to latch 308 asserted by state machine 304. The master may then be released by asserting ready_in (WB) 246, which provides a "handshake" signal to the master device. Additionally, buffer 302 may latch the target address on address bus Addr 214. Note that the address bus, and data bus WData 216 may be pipelined. That is, the address and data may overlap. In other words, the address phase of a subsequent transfer may occur during the data phase of the previous transfer. The AMBA™ AHB architecture is a pipelined bus architecture. An embodiment of the present invention implemented in accordance with such a pipelined bus architecture, latch 308 may serve to latch a data value in which the corresponding address value may be latched in response to ready_in 220 one clock cycle earlier. That is, latch 308 may be asserted by state machine 304 one bus clock cycle after ready_in 220 is asserted.

Figure 4:
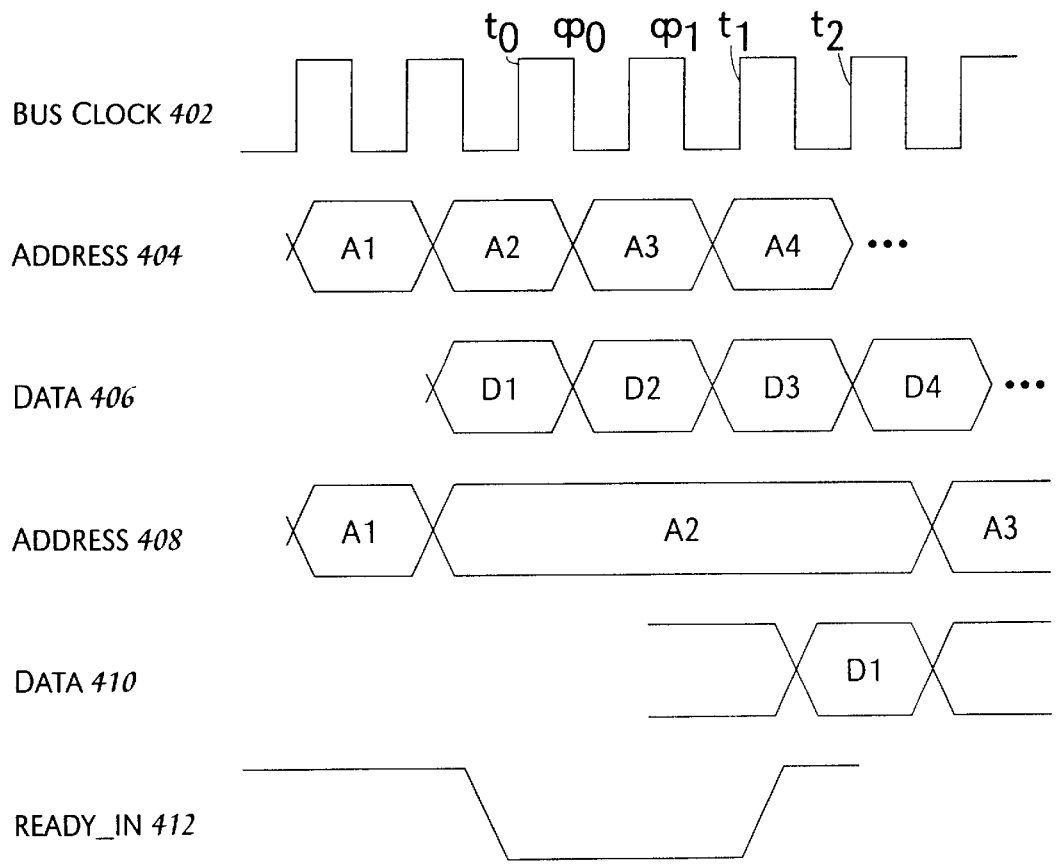
FIG. 4 illustrates a timing diagram associated with a pipelined memory bus architecture.

This may be further understood by referring now to FIG. 4 which illustrates exemplary timing diagrams of a pipelined bus. In the embodiment of a pipelined bus architecture in accordance with FIG. 4, it is assumed that addresses and data latch on the rising edge of bus clock 402 however, in an alternative embodiment, latching on the falling edge may be used. Address signals 404 and data signals 406 show the pipelining of addresses and data. Note that the data, D1 at address A1 overlaps the assertion of the next address, A2. Similarly, the data, D2, at address A2 overlaps the next address, A3, and so forth.

If buffer 302 is full, and cannot store additional data, buffer full 310 may be asserted. To accommodate a filled buffer 302, wait states in the transfer may be inserted by state machine 304 by negating the Ready_in (WB) 246 signal. By way of illustration, in FIG. 4, ready_in 412 is negated prior to edge t0 of bus clock 402. Prior to edge $t_1$ of bus clock 402 the memory resource reasserts ready_in 412. Subsequent to edge $t_1$, the write data 410 at address A1, D1, becomes valid. And the data is latched at edge $t_2$ of bus clock 402. In this way, the state machine inserts wait states spanning two periods, $\phi_0$ and $\phi_1$ of bus clock 402 whereby the master device holds the data to be written to the buffer. As shown in address signal 408, the master device also holds the overlapped address, A2 over the wait states. Address A2 is latched at edge $t_2$ of bus clock 402. During the wait states, the buffer, for example buffer 302, may be flushed to memory.

Data may be flushed to the target slave device, typically memory, on WData (WB) 312. Additionally, in an embodiment in accordance with the pipelined architecture, addresses are set up on Addr (WB) 268 in accordance with the pipelining mechanism discussed in conjunction with FIG. 4.

WB 302 may flush data to the target memory device, when the memory device is granted access to the bus. In other words, WB 302 need not be full before flushing data to the target device. Additionally, data may be written to WB 302 by a bus master in parallel with flushing of data from WB 302. Data may be sequentially flushed by registers in buffer 302 by rotate 306. In an embodiment of the present invention, data may be from the buffer registers may be multiplexed onto the WData (WB) 312. In such an embodiment, rotate 306 may sequentially increment a select signal for the multiplexing logic. In an alternative embodiment, buffer 302 may be a shift register wherein rotate 306 may provide a shift register clock. Data may be valid on WData (WB) 312 one bus clock cycle after the corresponding address is valid on addr (WB) 268 in accordance with a pipelined bus architecture.

Handshaking for the flush of buffer 302 to the slave device may be provided by ready_(M) 238. State initiation of transfer from buffer 302, and the target slave device may insert wait states by negating ready_(M) 238 in accordance with the mechanism discussed hereinabove in conjunction with FIG. 4. In response, finite state machine 304 will hold the pending addresses and data being transferred on Addr (WB) 268 and WData (WB) 312, respectively. Upon completion of the flush of buffer 302, buffer empty 314 may be asserted.

Figure 5:
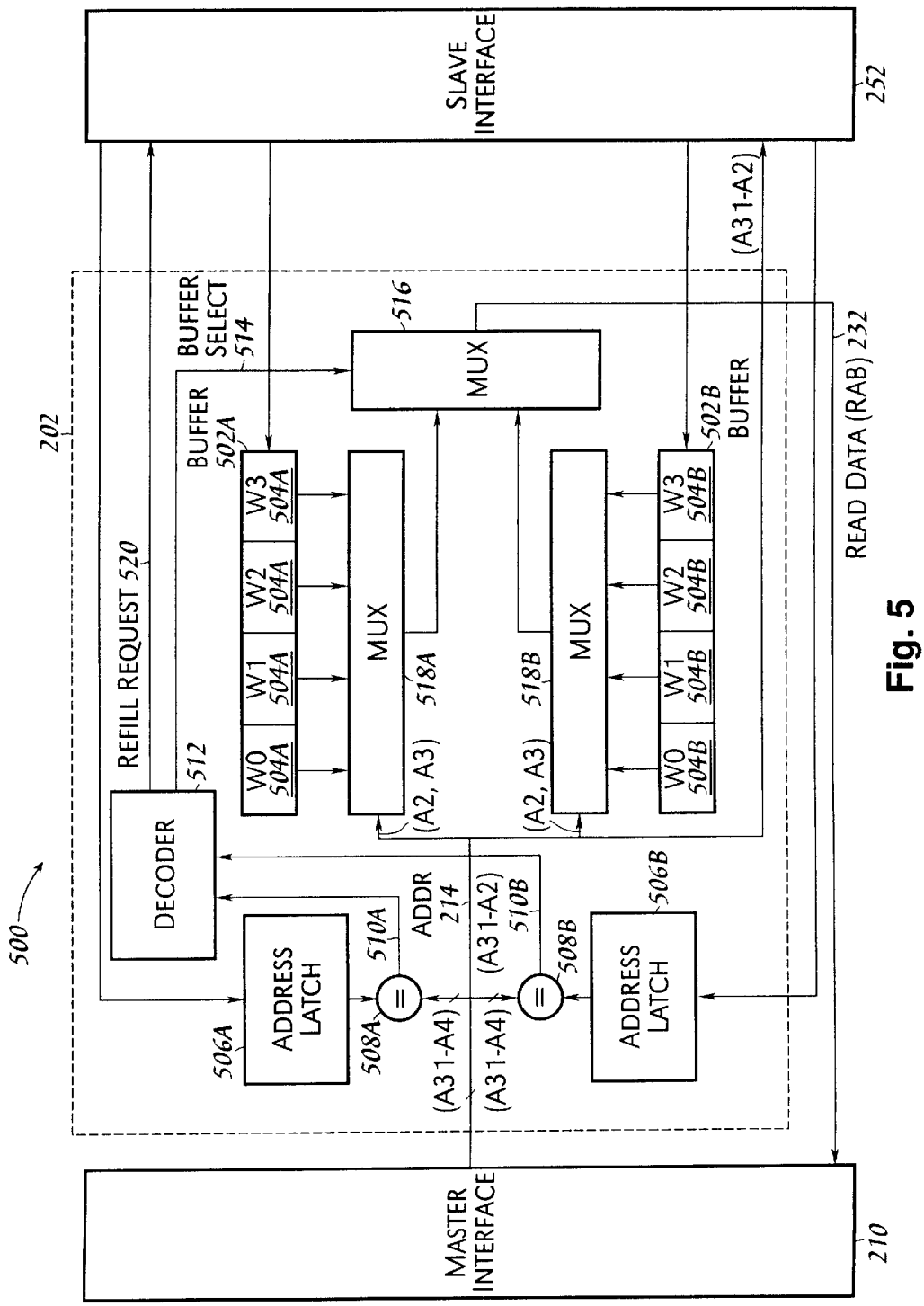
FIG. 5 illustrates, in block diagram form, a read-ahead buffer portion of the buffer unit of FIG. 2.

Refer now to FIG. 5 illustrating portion 500 of buffer unit 136. Portion 500 includes an embodiment of RAB 202 in accordance with the present inventive principles illustrated in further detail in FIG. 5. RAB 202 includes, in the exemplary embodiment depicted in FIG. 5, two buffers, buffer 502A and 502B. Each of buffers 502A and 502B include four registers, 504A and 504B, respectively. Each register may store a data value, which, in the embodiment of RAB 202 in FIG. 5 may be a data word. (For purposes herein, it is not necessary to distinguish between values interpreted as instructions as data, and "data" will be used to generically refer to both.) A word may include four bytes. Note, however, that one of ordinary skill in the art would appreciate that alternative implementations of buffers 502A and 502B may include other numbers of registers, and, each register may be configured to hold other lents of data values. Additionally, it would be recognized by artisans of ordinary skill that a word need not be limited to four byte values, but may contain other numbers of bytes, and such alternative embodiments would fall within the spirit and scope of the present invention.

Buffers 502A and 502B store read data from a memory device in response to a read request from a bus master. A bus master may read four bytes, that is, a word at a time. The address of the first word stored in each of buffers 502A and 502B is held in a corresponding one of address latches 506A and 506B. The operation of RAB 202 will be described in additional detail in conjunction with FIGS. 6 and 7, however, as previously discussed, to reduce memory latency, data may be read ahead from the address of a current read request, and stored in one of buffers 502A and 502B, wherein the corresponding address of the first word read ahead may be stored in the corresponding one of address latch 506A and 506B.

In response to a next read request from the bus master, the address of the request is compared with the addresses stored in latches 506A and 506B via the corresponding comparators 508A and 508B. Note that, because, in the embodiment of RAB 202 illustrated in FIG. 5, each of buffers 502A and 502B store four words, W0–W3, only bits A31–A4 need be compared, in an embodiment in which thirty-two bit addressing is used. In other words, the four least-significant bits of the address are not used. Those of ordinary skill in the art would recognize that addressing via other numbers of bits may be used in the data processing art, and that alternative embodiments of RAB 202 may be implemented accordingly. Such embodiments would fall within the spirit and scope of the present invention. If either of the addresses in latches 506A and 506B correspond to bits A31–A4 of the read request address, the corresponding comparator, 508A or 508B asserts its respective output, 510A and 510B. Decoder 512 selects the buffer holding the requested data via buffer select 514 and MUX 516. Additionally, the lowest two relevant bits of the address, A2 and A3 are decoded by multiplexers 518A and 518B to select the requested data word from the corresponding register 504A, B. MUX 516 selects one of the outputs from MUX 518A and 518B in response to buffer select 514, which, as noted above, is output by decoder 512 in response to the assertion of one of outputs 510A and 510B. If, neither of buffers 502A and 502B contain the requested data word, outputs 510A and 510B of comparators 508A and 508B, respectfully, are negated, and decoder 512 asserts refill request 520. Refill request 520 may be provided to the memory controller (not shown in FIG. 5) via slave interface 252.

Referring again to FIG. 2, to mitigate against loss of coherency between data in WB 204 and RAB 202, such as an embodiment of RAB 202 in accordance with FIG. 5, or alternatively, FIG. 6, an arbitration process may be implemented. In FIGS. 6.1–6.4, there are illustrated, in flowchart form, arbitration process 600 in accordance with the present inventive principles. Pending a bus request, which may be either a write request or read request, process 600 loops in step 602. On receipt of a bus request, in step 604 it is determined if the buffer unit, for example, buffer unit 136, FIG. 2, is enabled. If not the buffer is bypassed step 606. Otherwise, in step 608 it is determined if the bus request is a request to access buffer unit configuration registers.

If the request is a register access request, process 600 loops, step 610, until any pending activity in the buffer completes. If there is no pending activity in the buffer unit, in step 612 register access is granted and in step 614 data is written by the requesting master to the configuration register as the requested address. Process 600 then returns to step 602.

If, in step 608, the request is not an register access request, in step 618 access request is granted and process 600 returns to step 602 to receive further bus request.

Grant request step 618 is illustrated in further detail in FIG. 6.2. If, in step 620, the current request is a read request, in step 622 a read subprocess is launched. Alternatively, if in step 620 the current request is a write request, a write subprocess is launched, step 624. Step 618 then returns to step 602 as previously described. Note that read/write request to the buffer unit may be asynchronous, that is, a subsequent request may be made before a prior request completes. Thus, the "read" and "write" branches in step 620 may be performed in parallel. Read and write subprocesses which may be performed in accordance with step 622 and 624, respectively, will be described in conjunction with FIGS. 6.3 and 6.4.

Referring first to FIG. 6.3, there is illustrated therein, write subprocess 640 in accordance with the present inventive principles of arbitration process 600 in that at least a portion of the steps of subprocess 640 may be performed by state machine 304, FIG. 3. If, in step 641, the WB is not empty, in step 642, a buffer flush is launched. The flushing of the WB will be discussed further in conjunction with FIG. 6.4. While the buffer is flushed, step 643, write subprocess 640 performs steps 644–652. If however, in step 643, the flush of the buffer stalls, as described hereinbelow, step 643 loops until the flush of the WB proceeds. If the flush of the buffer is not stalled, or, in step 641 the WB was empty, in step 644, the data is written to the WB. In step 644 data is written to a write buffer such as buffer 302, FIG. 3. In step 645 it is determined if the write address is equal to an RAB data address, such as, an address in one of address latches 506A and 506B, FIG. 5, or, alternatively, one of register 704A and 704B, FIG. 7 to be described subsequently. If so, in step 646 the RAB is unlocked, and in step 648 the write data is written to the read ahead buffer. In step 650 and the read ahead buffer locked. The unlocking and locking of the RAB in accordance with the present inventive principled will be discussed further in conjunction with an embodiment of an RAB described in FIG. 7. Subprocess 640 terminates, in step 652. Returning to step 645, if the write address does not correspond to an RAB data address, then steps 646–652 are bypassed.

Referring now to FIG. 6.4, there is illustrated therein, in flowchart form, flush subprocess 650 in accordance with an embodiment of the present invention. In step 652, it is determined if the RAB is busy loading from a memory device, that is, the RAB is "busy" on the slave side. Recall, in an embodiment of a RAB in accordance with RAB 202, FIG. 2, RAB busy 215 may be asserted when the RAB is loading data from a memory bus. If so, the flush stalls whereby step 652 loops. When the RAB relinquishes the slave bus, step 652 breaks out of the loop and in step 654 the buffer is flushed to a target memory device. In step 656, flush subprocess 650 terminates. Termination step 656 may be in response to an assertion of buffer empty 314 (FIG. 3).

Referring now to FIG. 6.5, there is illustrated therein, in flowchart form, read subprocess 660 in accordance with the present inventive principles. Note that at least a portion of the steps may be performed, in an embodiment RAB 202 in accordance with FIG. 7, by state machine 708, to be described below.

In step 662 it is determined if the read request hits in the active buffer, such as one of buffers 502A and 502B, FIG. 5, or, alternatively, 702A and 702B, FIG. 7, discussed below. If not, in step 664, it is determined if the requested address hits in the inactive buffer. In steps 665 and 666 the buffer is loaded from memory. If in step 665, the write buffer has access to the slave-side bus, that is, is flushing to a memory device, process 660 loops until the bus is relinquished.

Returning to step 664, if the requested address hits in the inactive buffer, the active and inactive buffers are switched in step 668. In step 670, the inactive buffer is reloaded, and data is supplied from the active buffer 672. Read subprocess 660 terminates in step 662.

Refer now to FIG. 7 illustrating an embodiment of a read ahead buffer 202 in further detail. RAB 202 in FIG. 7 includes buffers 702A and 702B. Buffers 702A and 702B include registers 504A and 504B, respectively, discussed in conjunction with FIG. 5. Additionally, buffers 702A and 702B include address registers 704A and 704B which provide the functionality corresponding to address latches 506A and 506B, respectively, in FIG. 5. Additionally, buffer 702A includes register 706A, and buffer 702B includes register 706B for holding a validity bit, v, as will be discussed further hereinbelow.

As previously discussed, buffers 702A and 702B may be filled and read in response to read request from a bus master. State machine 708 arbitrates the reading and filling process. During pendancy of RAB transactions, state machine 708 may assert RAB busy 215.

When a master asserts a read request, the master sets an address on Addr 214. A portion of the address, in the exemplary embodiment illustrated in FIG. 7, bits A31–A2, may be held in latch 710. Additionally, the master may assert ReadBuf 712. For concreteness, RAB 202 in FIG. 7 is described in conjunction with a thirty-two bit wide memory address bus. (However, those of ordinary skill in the art would understand that the present inventive concepts are not restricted to a particular bus width, and alternative embodiments implemented in conjunction with memory buses of other widths would be understood by those persons of ordinary skill in the art, as falling within the spirit and scope of the present invention.) ReadBuf 712 is input to state machine 708. State machine 708 may signal the requesting bus master that data is ready by asserting ReadyBuf 714. Data may be provided by one of buffer 702A and 702B depending on the address of the data stored therein, as has been described hereinabove, and will be further described hereinbelow. (If the address does not hit in one of the buffers, data is loaded from the memory device.)

The requested address is compared with the addresses stored in register 704A of buffer 702A by comparator 508A, and similarly, with the address in register 704B of buffer 702B by comparator 508B. As previously described, the four least significant bits, A3–A0, are redundant, because, in the embodiment illustrated in FIG. 7, each of buffers 702A and 702B store four data words, W0–W3 of four bytes each. If a hit is obtained in one of the buffers, the corresponding one of comparators 508A and 508B asserts its respective output 510A and 510B. In response, state machine 708 selects the corresponding input of MUX 516 for outputting on ReadData (WB) 232, via select 716. The inputs in MUX 516 are obtained from the output of MUXs 518A and 518B. As discussed hereinabove, MUXs 518A and 518B may effect selection of the requested word from the corresponding: one of buffer 602A and 602B by decoding the least significant bits of a word address, that is, address bits A3 and A2, in an embodiment in which a data word is four bytes wide. (Those of ordinary skill in the art would appreciate that the selection of word having a different length may be effected by decoding a corresponding number of address bits.) Note that word W3 is provided to the corresponding one of MUX 518A and 518B via multiplexer 718A and 718B, respectively. Additionally, MUXs 718A and 718B receive word W3 directly from memory. The operation of these multiplexers will be described further hereinbelow in conjunction with a description of the buffer filling process. Assuming, however, for the present discussion, that the read request address does not coincide with a read-ahead buffer filling operation, state machine 708 configures select 720A and select 720B to select word W3 from buffers 702A and 702B, respectively.

In parallel with supplying the requested data, RAB 202 may prefetch data from memory that is next contiguous with the requested data word. State machine 708 may maintain a status value for each of buffers 702A and 702B, whereby the refilling of RAB 202 will load the data into an inactive buffer. Thus, state machine 708 may maintain a status bit for buffer 702A in status register 722A and for buffer 702B in status register 722B. State machine 708 may set the last read buffer as the active buffer. Only one of buffers 702A and 702B may be active at a given time. Thus, for example, if the read request as described above, hit in buffer 702A and the status of buffer 702A was previously active, the status will remain active. Conversely, if the hit is in buffer 702B, and buffer 702A is currently the active buffer, the status of buffer 702A and 702B will switch. Thus, in the latter instance, buffer 702B will become the active buffer and the status of 702A will be to inactive. (The case in which neither buffer can deliver the requested data will be discussed hereinbelow.) In filling RAB 202, the data from memory will be loaded into the inactive buffer.

State machine 708 clears the validity bit in the corresponding one of registers 706A and 706B for the inactive buffer. Additionally, because the inactive buffer did not supply the requested data, the address in the corresponding register 704A or 704B, is "stale" by '2' (10b). (Binary values are denoted by the suffix "b".) Thus, the address may be incremented by '2' (10b) by the respective one of adders 724A and 724B. The updated address is loaded into the respective one of registers 704A or 704B via the corresponding multiplexer, 726A and 726B in response to select 728A or 728B from state machine 708. The updated address is also driven onto Addr (WB) 268 via MUX 730 and latch 732. The least significant bits (A3, A2) of the word aligned address in latch 732 may be concatenated onto the address from the output from MUX 730 from the output of latch 710. MUX 730 selects for the updated address in response to select 734 from state machine 708. Additionally, state machine 708 asserts refill request 520 to signal the memory controller (not shown in FIG. 7) to supply the data. In response, when the memory controller can supply the data, it drives the data on RData (M) 230 and asserts Ready_in (M) 238.

The four new data words are sequentially loaded into the corresponding one of registers 504A or 504B, depending on which buffer is active as previously described, via the corresponding demultiplexer (DEMUX) 734A and 734B. DEMUXs 734A and 734B are controlled by state machine 708 via selects 736A and 736B, respectively. Additionally, word W0–W3 of new data are consecutively requested from memory by sequentially driving the corresponding address on Addr (WB) 268 and asserting refill request 520 as previously described. The word addresses may be derived from the output of latch 732 which may be incremented by adder 638 by adding '1' to the least significant bit of the address in latch 732. The address thus incremented may be selected from the output of adder 738 via MUX 730 and select 734 from state machine 708. After the four new data words, W0–W3, have been loaded in this way, state machine 708 sets the validity bit in the corresponding one of registers 706A and 706B via the respective R/W Valid 622A, 622B line.

If a bus master requests data which can not be delivered by either of buffers 702A or 702B, state machine 708 holds the bus master by negating ReadyBuf 714. State machine 708 may then clear the validity bits in registers 706A and 706B. The requested address may then be loaded into register 704A of buffer 702A via MUX 726A and select 702A. Additionally, the twenty-eight bit address portion, A31–A4 (in an embodiment corresponding to a thirty-two bit wide bus) may be incremented by '1' by adder 740 and loaded into register 704B of buffer 702B via MUX 726B and select 728B. Buffers 702A may then be loaded with data as previously described beginning with the word with the twenty-eight bit address portion in register 704A. Likewise, buffer 702B may be loaded as previously described with the first word, W0, having the twenty-eight bit address portion loaded in register 704B of buffer 702B. The requested data may then be supplied from 702A via MUX 516.

Note that during a buffer load, a read request may be received having an address within the address span of the data being loaded. This may be detected by the assertion of a corresponding one of comparator outputs 510A and 510B while the corresponding validity bit is cleared. In this case, state machine 708 may hold the requesting bus master by negating ReadyBuf 714. The master may be held until loading is complete. To expedite transfer of the data to the master, during the load of the last word, W3, the corresponding one of MUXs 718A and 718B may forward the data from RData (M) 230 directly via the corresponding MUX 518A and 518B without having to pass the data through the buffer register.

As discussed hereinabove, coherence between the data in the write buffer unit, such as WB 204, FIG. 2, and RAB 202 may be maintained by substantially concurrently writing the write data to RAB 202. State machine 708 may detect a write to the write buffer unit, which hits RAB 202 via R/W 218 and outputs 510A and 510B from comparators 508A and 508B, respectively. In response, state machine 708 may negate a corresponding one of lock registers 742A and 742B, thereby unlocking the associated one of buffers 706A and 706B. Lock registers 742A and 742B may include four bits, B0–B3. Each of the four bits may be separately asserted/negated whereby each words w0–w3, of the corresponding buffers, 706A and 706B, may be locked or unlocked depending on the sate, asserted or negated, of the respective bit in the lock register. It would be appreciated by those of ordinary skill in the art that alternative embodiments of lock registers 742A and 742B may include other numbers of bits in conjunction with buffer embodiments having other numbers of registers 504A and 504B. (In this way, state machine 708 may perform step 646, FIG. 6.3 in accordance with the principles of arbitration process 600.) After the data is written to the corresponding buffer, 706A or 706B, (step 648, FIG. 6.3), state machine 708 may assert the associated one of lock register 742A and 742B, thereby locking the buffer, in accordance with step 650, FIG. 6.3.

Although the present invention and its advantages have been described in detail, it should be understood that various changes, substitutions and alterations can be made herein without departing from the spirit and scope of the invention as defined by the appended claims.

What is claimed is:

1. A buffer apparatus comprising:
   a read buffer unit configured for storing at least one data value read from a memory device; and
   a write buffer unit configured for storing at least one data value for writing to said memory device, wherein said read buffer unit is operable for updating with said at least one data value for writing to said memory device in response to a write to said write buffer unit.

2. The apparatus of claim 1 wherein said read buffer unit comprises a first buffer and a second buffer, each of said first and second buffers configured for storing at least one data value, and wherein said second buffer is operable for prefetching a second data value from said memory device in response to a match between a read request address and an address of a first data value in said first buffer.

3. The apparatus of claim 2 further comprising compare logic configured for comparing at least a portion of said read request address and a corresponding portion of said address of said first data value in said first buffer.

4. The apparatus of claim 2, wherein said first buffer is operable for prefetching a third data value in response to a read request address portion matching a corresponding address portion of said second data value.

5. The apparatus of claim 2 wherein said at least one data value comprises a plurality of words, each word having a length comprising a predetermined number of bytes, and wherein an address of a first word of said second data value is contiguous with an address of a last word of said first data value.

6. The apparatus of claim 5 further comprising first and second selection logic coupled to a respective one of said first and second buffers, said first and second selection logic operable for outputting a requested word from said plurality of words in response to said read request address.

7. The apparatus of claim 6 wherein said first and second selection logic each includes a multiplexer coupled to a corresponding one of said first and second buffers, each multiplexer configured to receive a predetermined portion of said read request address, and wherein each multiplexer is configured to output said requested word in response to said predetermined portion of said read request address.

8. The apparatus of claim 1 further comprising logic configured to lock said read buffer unit in response to updating with said at least one data value for writing to said memory device.

9. The apparatus of claim 1 further comprising:
   logic operable for delaying a write to said memory device from said write buffer unit pending completion of a read from said memory device by said read buffer unit; and
   logic operable for delaying a read from said memory device by said read buffer unit pending completion of a write to said memory device by said write buffer unit.

10. A system comprising:
   a processor configured to decode a digital signal from a digital signal source;
   a memory device for storing instructions and data for said processor, the instructions including instructions for decoding said digital signal;
   a buffer device coupled between said processor and said memory device for buffering memory transactions between said processor and said memory device, said buffer device comprising:
      a read buffer unit configured for storing at least one data value read from a memory device; and
      a write buffer unit configured for storing at least one data value for writing to said memory device, wherein said read buffer unit is operable for updating with said at least one data value for writing to said memory device in response to a write to said write buffer unit; and
   an amplifier for amplifying a decoded digital signal from said processor.

11. The system of claim 10 wherein said buffer apparatus further includes logic configured to lock said read buffer unit in response to updating with said at least one data value for writing to said memory device.

12. The system of claim 10 wherein said read buffer unit comprises a first buffer and a second buffer, each of said first and second buffers configured for storing at least one data value, and wherein said second buffer is operable for prefetching a second data value from said memory device in response to a match between a read request address and an address of a first data value in said first buffer.

13. The system of claim 12 wherein said at least one data value comprises a plurality of words, each word having a length comprising a predetermined number of bytes, said read buffer unit further comprising first and second selection logic coupled to a respective one of said first and second buffers, said first and second selection logic operable for outputting a requested word from said plurality of words in response to said read request address.

14. The system of claim 13 wherein said first and second selection logic each includes a multiplexer coupled to a corresponding one of said first and second buffers, each multiplexer configured to receive a predetermined portion of said read request address, and wherein each multiplexer is configured to output said requested word in response to said predetermined portion of said read request address.

15. The system of claim 10 wherein said buffer device further comprises:

logic operable for delaying a write to said memory device from said write buffer unit pending completion of a read from said memory device by said read buffer unit; and logic operable for delaying a read from said memory device by said read buffer unit pending completion of a write to said memory device by said write buffer unit.

16. A memory device transaction method comprising the steps of:

in response to a transaction request to a write buffer unit:
if a request address corresponds to a data address in a read buffer unit:
copying data in the write buffer unit to the read buffer unit; and
locking said read buffer unit.

17. The method of claim 16 wherein the buffer unit comprises first and second buffers, each of the first and second buffers having a status value, wherein if the request address corresponds to a data address in the read buffer unit in response to a transaction request to the read buffer unit, the method further comprises the steps of:

switching the status value of one of the first and second buffers corresponding to the request address to a second status value if the status value has a first status value; and loading a next data value in one of the first and second buffers having the second status value.

18. The method of claim 17 further comprising the step of delaying a read from the read buffer unit if a write transaction is pending in the write buffer unit.

* * * * *